US010363811B2

(12) United States Patent
Klop et al.

(10) Patent No.: US 10,363,811 B2
(45) Date of Patent: Jul. 30, 2019

(54) VEHICLE SPEED CONTROLLED ACTIVE GRILLE SHUTTER SYSTEM

(71) Applicant: Ford Global Technologies, LLC, Dearborn, MI (US)

(72) Inventors: Aaron Peter Klop, Bloomfield Hills, MI (US); Steven James Parks, Royal Oak, MI (US); Joseph James Gallo, Fraser, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 831 days.

(21) Appl. No.: 13/916,814

(22) Filed: Jun. 13, 2013

(65) Prior Publication Data
US 2014/0370795 A1    Dec. 18, 2014

(51) Int. Cl.
*B60K 11/08* (2006.01)
*B60H 1/24* (2006.01)
*B60H 1/34* (2006.01)
*B60K 11/06* (2006.01)

(52) U.S. Cl.
CPC ............ *B60K 11/085* (2013.01); *B60H 1/242* (2013.01); *B60H 1/3421* (2013.01); *B60K 11/06* (2013.01); *Y02T 10/88* (2013.01)

(58) Field of Classification Search
CPC ...... B60H 1/242; B60H 1/3421; B60K 11/06; B60K 11/085
USPC .......................................................... 454/75
See application file for complete search history.

(56) References Cited

U.S. PATENT DOCUMENTS

| | | | | |
|---|---|---|---|---|
| 1,737,946 A | * | 12/1929 | Rood | F01P 7/10 165/98 |
| 4,457,558 A | | 7/1984 | Ishakawa | |
| 4,692,095 A | * | 9/1987 | Lawson-Tancred | F03D 7/0252 416/169 R |
| 4,757,245 A | * | 7/1988 | Ayers | G05B 19/40 318/685 |
| 5,141,026 A | * | 8/1992 | Collette | B60K 11/085 137/601.09 |
| 5,174,253 A | * | 12/1992 | Yamazaki | F01L 1/34406 123/90.17 |
| 5,625,269 A | * | 4/1997 | Ikeda | H02P 8/14 318/400.34 |
| 6,078,860 A | * | 6/2000 | Kerns | B60K 31/042 123/399 |
| 6,152,692 A | * | 11/2000 | Aubry | B64C 27/615 244/17.25 |

(Continued)

OTHER PUBLICATIONS

"Stepper Motor and Controller Primer—Phidgets Support" at https://www.phidgets.com/docs/Stepper_Motor_and_Controller_Primer (and attached as "Stepper Motor and Controller Primer—Phidgets Support.pdf").*

*Primary Examiner* — Avinash A Savani
*Assistant Examiner* — Martha M Becton
(74) *Attorney, Agent, or Firm* — Vichit Chea; Price Heneveld LLP

(57) ABSTRACT

An active grille shutter system for use in a moving vehicle is provided herein and includes at least one vane angularly displaceable between an open position and a closed position, a motor having a hold current applied thereto for maintaining the at least one vane in a vane position, and a controller for adjusting the amount of hold current being applied to the motor based on vehicle speed.

14 Claims, 4 Drawing Sheets

(56) References Cited

U.S. PATENT DOCUMENTS

| | | | | |
|---|---|---|---|---|
| 6,325,331 B1* | 12/2001 | McKeown | | B64C 13/08 244/220 |
| 6,439,328 B1* | 8/2002 | Vaillancourt | | B60K 11/085 123/41.58 |
| 7,338,260 B2* | 3/2008 | Brundle | | A61M 5/142 417/12 |
| 7,717,208 B2 | 5/2010 | Knauer | | |
| 7,728,543 B2* | 6/2010 | Takemori | | H02P 8/12 318/432 |
| 7,757,643 B2* | 7/2010 | Harich | | B60K 11/085 123/41.04 |
| 7,942,232 B2 | 5/2011 | Matsuda et al. | | |
| 8,084,982 B2* | 12/2011 | Grabinger | | F16K 31/046 318/558 |
| 8,091,668 B2 | 1/2012 | Amano et al. | | |
| 8,161,919 B2* | 4/2012 | Klotz | | B60K 11/085 123/41.04 |
| 8,505,660 B2* | 8/2013 | Fenchak | | B60K 11/085 180/68.1 |
| 8,561,739 B2* | 10/2013 | Hori | | B60K 11/085 180/68.1 |
| 8,698,444 B2* | 4/2014 | Malkin | | B64C 13/28 244/76 R |
| 8,915,320 B2* | 12/2014 | Chinta | | B60K 11/085 180/68.1 |
| 9,190,942 B2* | 11/2015 | Polcuch | | H02P 8/40 |
| 9,393,861 B2* | 7/2016 | Hori | | B60K 11/04 |
| 9,744,847 B2* | 8/2017 | Anderson | | B60K 11/085 |
| 9,810,138 B2* | 11/2017 | Solazzo | | F01P 11/14 |
| 2005/0083007 A1* | 4/2005 | Nireki | | G07F 17/3213 318/696 |
| 2005/0206340 A1* | 9/2005 | Brundle | | A61M 5/142 318/685 |
| 2005/0278071 A1* | 12/2005 | Durham, III | | G05D 23/1932 700/276 |
| 2007/0040529 A1* | 2/2007 | Takebayashi | | G05B 19/40 318/685 |
| 2008/0099261 A1* | 5/2008 | Sturmon | | B60K 11/08 180/68.1 |
| 2010/0085003 A1* | 4/2010 | Spring | | H02P 8/04 318/573 |
| 2010/0147611 A1* | 6/2010 | Amano | | B60K 6/445 180/68.1 |
| 2010/0226772 A1* | 9/2010 | Deering | | F03D 7/0204 416/1 |
| 2010/0243351 A1 | 9/2010 | Sakai | | |
| 2010/0243352 A1* | 9/2010 | Watanabe | | B60K 11/085 180/68.1 |
| 2010/0252691 A1* | 10/2010 | Malkin | | B64C 13/28 244/76 R |
| 2010/0258368 A1* | 10/2010 | Martin | | F02D 29/02 180/65.28 |
| 2011/0118945 A1* | 5/2011 | Mochizukil | | B60K 11/085 701/49 |
| 2011/0137530 A1* | 6/2011 | Kerns | | F01P 7/10 701/49 |
| 2011/0204149 A1 | 8/2011 | Prior | | |
| 2011/0223463 A1* | 9/2011 | Katono | | B60K 6/485 429/120 |
| 2011/0238249 A1* | 9/2011 | Ananthakrishna | | B60L 11/14 701/22 |
| 2011/0246023 A1 | 10/2011 | Lockwood et al. | | |
| 2011/0288717 A1* | 11/2011 | Yu | | B60K 11/085 701/31.4 |
| 2011/0297468 A1* | 12/2011 | Coel | | B60K 11/085 180/68.1 |
| 2011/0308763 A1* | 12/2011 | Charnesky | | B60H 1/3227 165/41 |
| 2012/0018578 A1* | 1/2012 | Polcuch | | B64C 13/50 244/99.2 |
| 2012/0060776 A1* | 3/2012 | Charnesky | | B60K 11/085 123/41.05 |
| 2012/0097464 A1* | 4/2012 | Waugh | | B60K 11/085 180/68.1 |
| 2012/0118656 A1* | 5/2012 | Roddy | | B60K 11/085 180/68.1 |
| 2012/0132474 A1* | 5/2012 | Charnesky | | B60K 11/085 180/68.1 |
| 2012/0186890 A1* | 7/2012 | Hori | | B60K 11/085 180/68.3 |
| 2012/0305818 A1* | 12/2012 | Charnesky | | B60K 11/085 251/212 |
| 2013/0025952 A1* | 1/2013 | Kitashiba | | B60K 11/085 180/68.1 |
| 2013/0036991 A1 | 2/2013 | Kerns | | |
| 2013/0046445 A1 | 2/2013 | Nishimura et al. | | |
| 2013/0086839 A1* | 4/2013 | Klop | | B60K 11/085 49/1 |
| 2013/0103265 A1* | 4/2013 | Remy | | B60K 11/085 701/49 |
| 2013/0184943 A1* | 7/2013 | Sato | | B60H 1/00978 701/49 |
| 2013/0247862 A1* | 9/2013 | Sakai | | B60K 11/085 123/188.1 |
| 2013/0268164 A1* | 10/2013 | Sugiyama | | B60K 11/085 701/49 |
| 2013/0338870 A1* | 12/2013 | Farmer | | B60K 11/085 701/29.2 |
| 2014/0005897 A1* | 1/2014 | Hayakawa | | B60K 11/085 701/49 |
| 2014/0076646 A1* | 3/2014 | Povinelli | | B60K 11/085 180/68.1 |
| 2014/0273806 A1* | 9/2014 | Frayer, III | | B60K 11/085 454/335 |
| 2015/0083852 A1* | 3/2015 | Moser | | B64C 13/34 244/99.3 |
| 2015/0147949 A1* | 5/2015 | Macfarlane | | B60K 11/085 454/75 |
| 2015/0149043 A1* | 5/2015 | Macfarlane | | F01P 7/12 701/49 |
| 2015/0159541 A1* | 6/2015 | Solazzo | | B60K 11/085 73/114.68 |
| 2017/0021720 A1* | 1/2017 | Anderson | | B60K 11/085 |
| 2017/0106741 A1* | 4/2017 | Shaw | | B60K 11/085 |
| 2017/0225560 A1* | 8/2017 | Klop | | B60K 11/085 |

* cited by examiner

US 10,363,811 B2

VEHICLE SPEED CONTROLLED ACTIVE GRILLE SHUTTER SYSTEM

FIELD OF THE INVENTION

The present invention generally relates to an active grille shutter system for vehicle use and more specifically to an active grille shutter system having variable power consumption.

BACKGROUND OF THE INVENTION

Active grille shutter systems are currently in use in some vehicles. Since vehicle fuel economy and vehicle performance are often important factors in deciding whether or not to purchase a vehicle, there is a need for an active grille shutter system designed with such performance criteria in mind.

SUMMARY OF THE INVENTION

According to one aspect of the present invention, an active grille shutter system for use in a moving vehicle is provided, and includes at least one vane angularly displaceable between an open position and a closed position, a motor having a hold current applied thereto for maintaining the at least one vane in a selected vane position, and a controller for adjusting the amount of hold current being applied to the motor based on vehicle speed.

According to another aspect of the present invention, an active grille shutter system for use in a moving vehicle is provided, and includes at least one vane, an actuator for maintaining the at least one vane in a vane position, and a controller configured to adjust the amount of power being applied to the actuator based on a vehicle condition.

According to another aspect of the present invention, a method is provided for maintaining at least one vane in a selected vane position while a vehicle is moving, and includes the steps of sensing vehicle speed, applying power to an actuator to hold the at least one vane in the selected vane position, and adjusting the amount of power being applied to the actuator based on the sensed vehicle speed.

These and other aspects, objects, and features of the present invention will be understood and appreciated by those skilled in the art upon studying the following specification, claims, and appended drawings

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
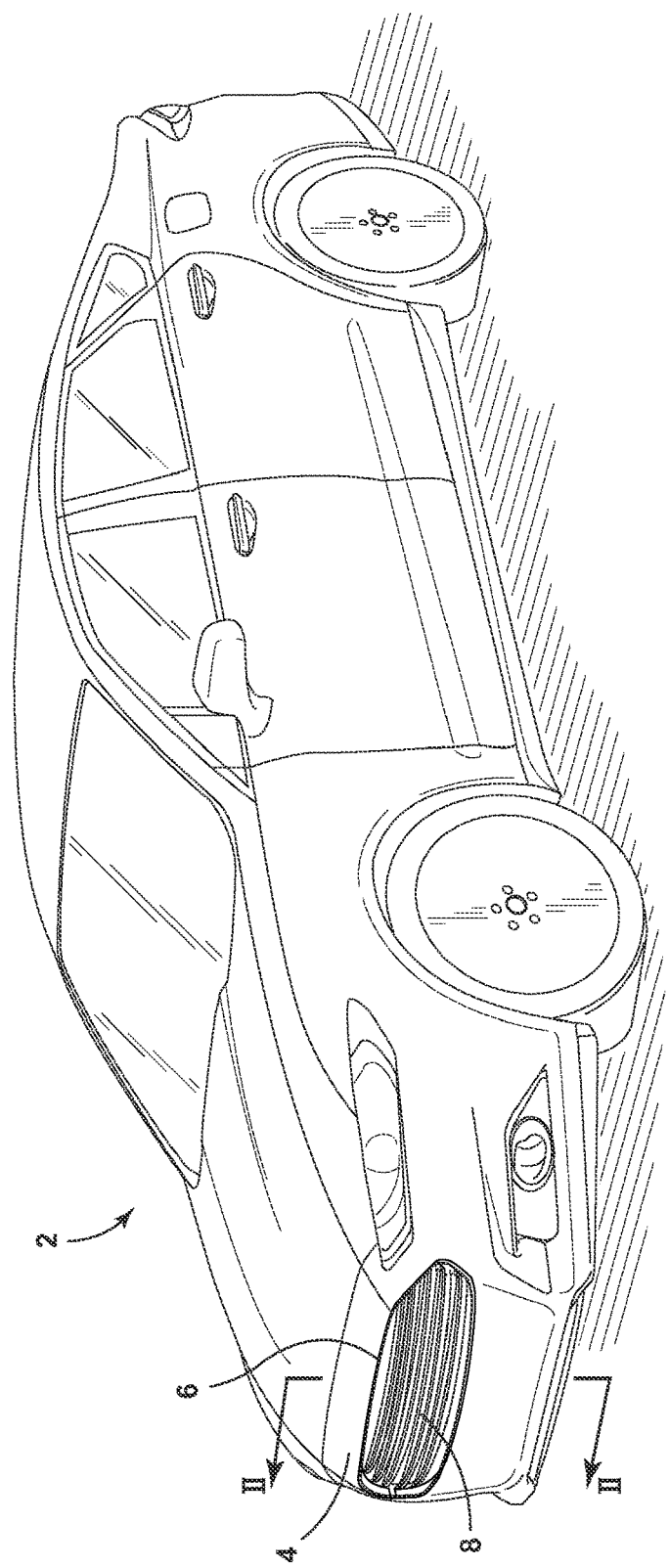
FIG. 1 is a perspective view of a vehicle provided with a grille in the front end of the vehicle.

Referring to FIG. 1, a vehicle 2 is generally shown having a front end 4 defining an opening 6 and a grille 8 that engages the opening 6. While provided generally herein, the grille 8 may take on a variety of structural and/or cosmetic configurations depending on the vehicle and typically functions to enable airflow therethrough and to prevent large objects from entering the grille 8 and possibly damaging interior components. To gain a better understanding of the present invention, an active grille shutter system will be described in detail below in relation to grille 8. However, those having ordinary skill in the art should recognize that some vehicles may have more than one grille and that the active grille shutter system described below can be adapted to accommodate vehicles having single and multi-grille configurations.

Figure 2:
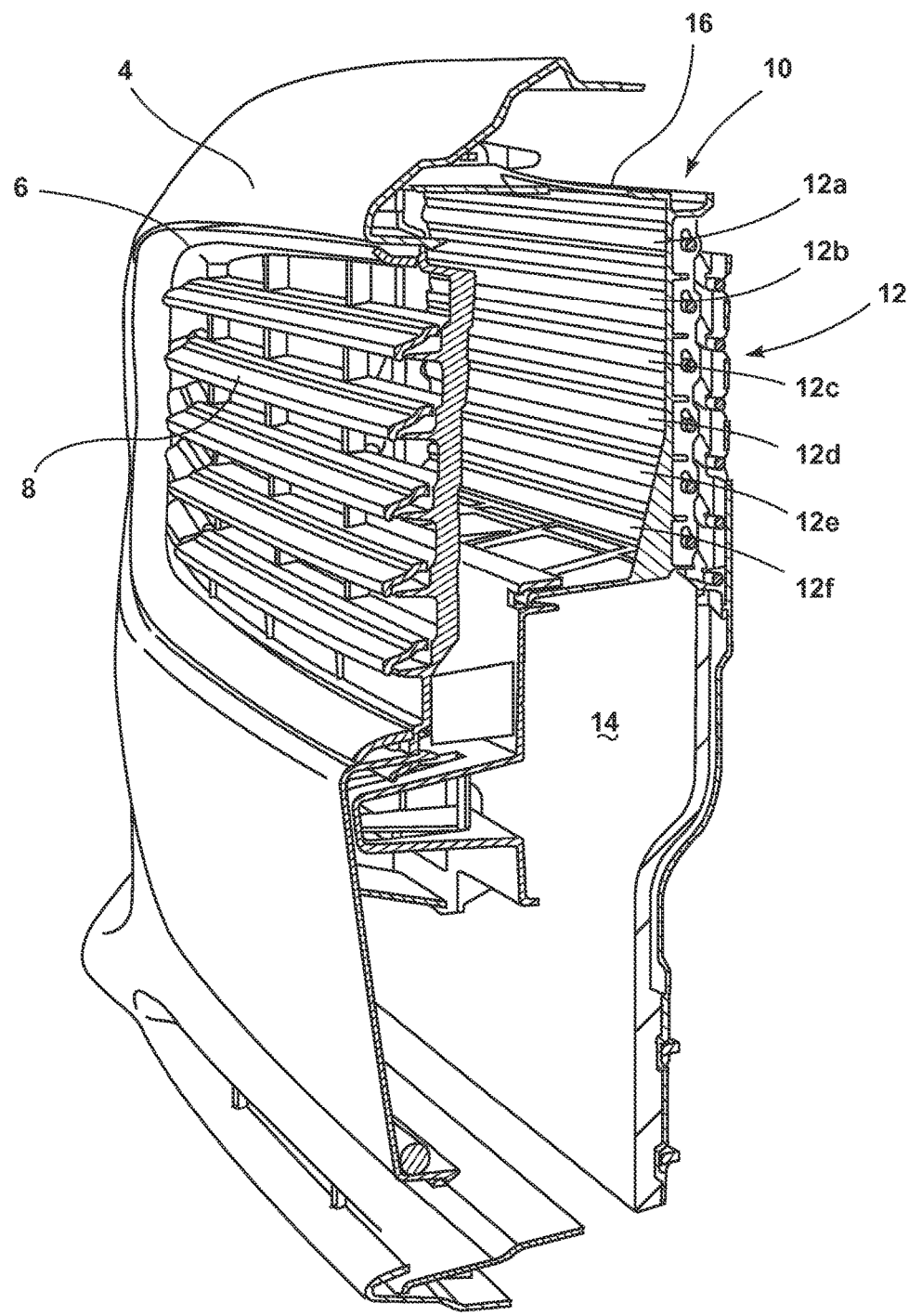
FIG. 2 is partial cross-sectional view of the front end of the vehicle taken along line II-II of FIG. 1, wherein a vane assembly of an active grill shutter system is shown.

Referring to FIG. 2, a partial cross-sectional view of the front end 4 of vehicle 2 is shown to illustrate one embodiment of an active grille shutter system 10 that includes a vane assembly 12, which is also commonly known in the art as an active grille shutter (AGS). The vane assembly 12 may be of a conventional type and is generally provided in an engine compartment 14 of the vehicle 2. The vane assembly 12 includes one or more vanes, exemplarily shown herein as vanes 12a-12f that are disposed parallel to one another and are retained in a housing 16 located near the grille 8. Vanes 12a-12f are conventionally linked together, each vane 12a-12f being angularly displaceable about its longitudinal axis, wherein angular displacement of vanes 12a-12f occurs in a synchronous manner to enable the vanes 12a-12f to assume a selected vane position between and inclusive of an open and a closed position.

Figure 3:
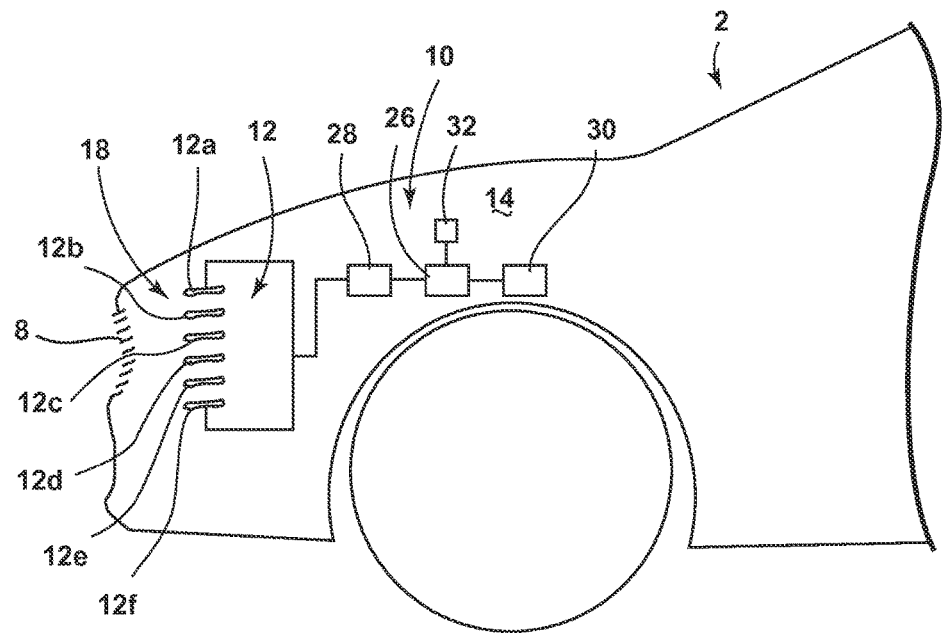
FIG. 3 is a diagrammatic view of the active grille shutter system wherein the vane assembly is illustrated in an open position.
Figure 4:
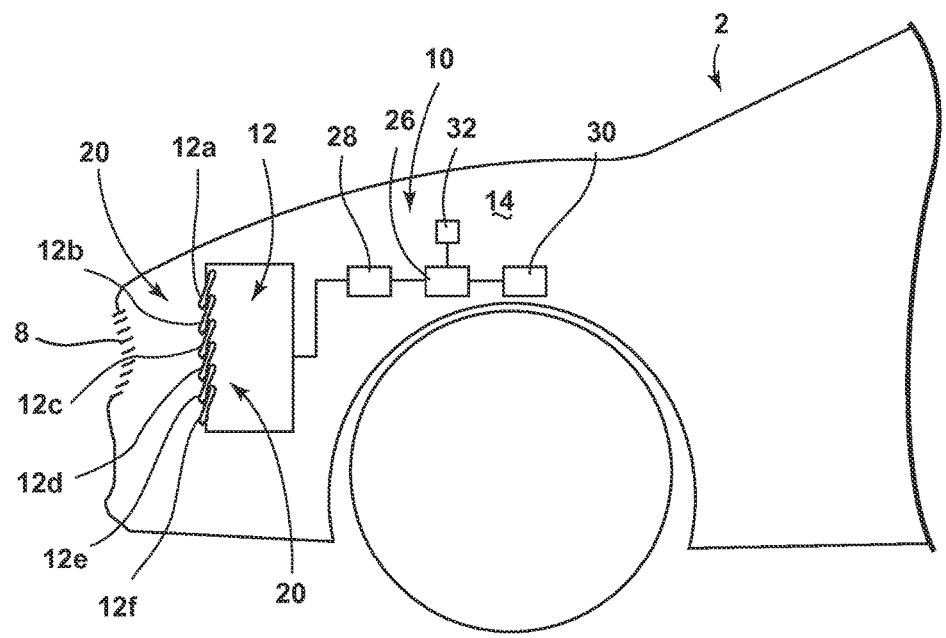
FIG. 4 is a diagrammatic view of the active grille shutter system wherein the vane assembly is illustrated in a closed position.
Figure 5:
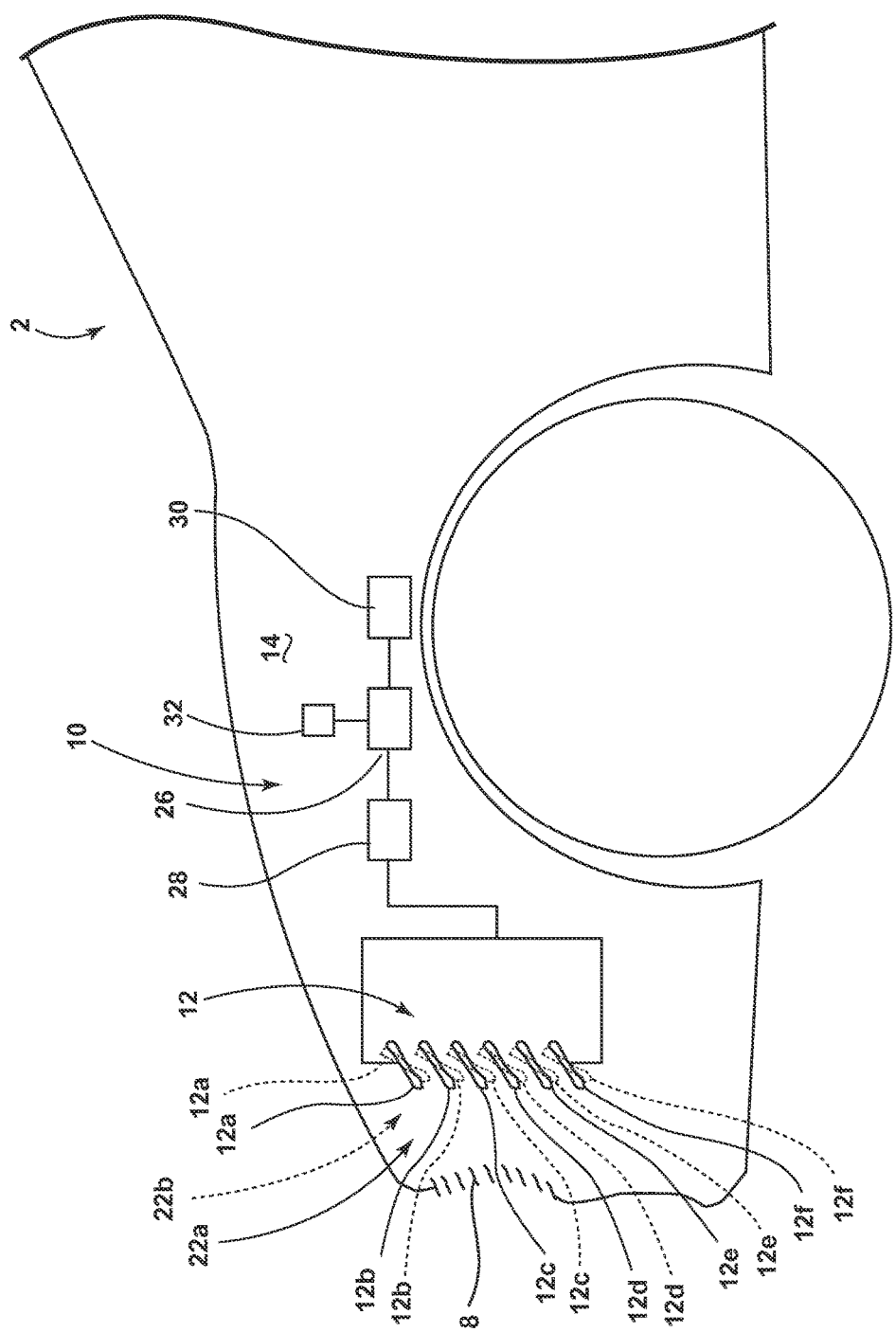
FIG. 5 is a diagrammatic view of the active grille shutter system wherein the vane assembly is illustrated in two different commanded positions.

Referring to FIGS. 3-5, one embodiment of the active grill shutter system 10 is shown, wherein the vane assembly 12 is exemplarily illustrated in several vane positions including an open position 18 in FIG. 3, a closed position 20 in FIG. 4, and a commanded position in FIG. 5, wherein the commanded position corresponds to one or more predetermined intermediate positions between the open and closed positions 18, 20 and is exemplarily illustrated in FIG. 5 as commanded positions 22a and 22b in solid and phantom lining, respectively.

In the open position 18 shown in FIG. 3, the vanes 12a-12f of vane assembly 12 are angularly displaced in a substantially horizontal configuration to enable a moving vehicle to draw air into the engine compartment 14 through grille 8 and vane assembly 12. The drawn air may be used to provide cooling to various components located within the engine compartment 14 such as a vehicle engine. In some instances, however, there is more air entering the engine compartment 14 than is needed for cooling purposes. More-over, at high speeds, the influx of air into the engine compartment 14 adds aerodynamic drag to the moving vehicle, resulting in greater energy expenditures to move the vehicle forward thus lowering fuel efficiency.

To reduce aerodynamic drag and increase fuel efficiency, vanes 12a-12f of vane assembly 12 may be angularly displaced in a counterclockwise direction with respect to the open position 18 shown in FIG. 3 until they reach the closed position 20 shown in FIG. 4, wherein vanes 12a-12f are substantially vertical to prevent air from entering the engine compartment 14, and instead, direct air around the vehicle. Alternatively, the vanes 12a-12f of vane assembly 12 may be angularly displaced in a counterclockwise direction with respect to the open position 18 shown in FIG. 3 until they reach a selected commanded position, such as commanded position 22a or 22b shown in FIG. 5, wherein vanes 12a-12f are positioned at a corresponding vane angle that is somewhere between the angular position of vanes 12a-12f in the open and closed positions 18, 20 to allow some airflow into the engine compartment 14 while also reducing aerodynamic drag and increasing fuel efficiency relative to the open position 18. It is to be understood however, that commanded positions 22a and 22b are for illustrative purposes and other commanded positions not shown herein may be similarly employed to either increase or decrease airflow to satisfy the cooling needs of vehicle 2.

In the commanded position, airflow either increases or decreases based the vane angle of vanes 12a-12f. In the embodiment shown in FIG. 5, airflow decreases as the vane angle approaches that of the closed position 20 and increases as the vane angle approaches that of the open position 18. Thus, with respect to commanded positions 22a and 22b, it can be seen that increased airflow and greater aerodynamic drag occurs in commanded position 22a relative to commanded position 22b. From the commanded position (i.e. commanded positions 22a and 22b) or the closed position 20, vanes 12a-12f of vane assembly 12 may be angularly displaced in a clockwise direction to once again assume the open position 18 or a different commanded position located therebetween, based on the vehicle's cooling needs.

To effectuate movement of the vane assembly 12, an actuator such as electric motor 26 is operably coupled thereto and may include a gear assembly 28 configured to angularly displace vanes 12a-12f to the selected vane position when electrical power is applied to the motor 26. Gear assembly 28 includes any conventional gear assembly such as a planetary gear assembly or other gear assembly capable of being back driven to allow the vane assembly 12 to be angularly displaced to and from the open position 18, the closed position 20, and any number of commanded positions therebetween. Motor 26 may include any electric motor that is capable of converting electrical energy into rotational movement such as a stepper motor. In the present embodiment, the motor 26 includes a stepper motor, whereby each step of the motor 26 causes angular displacement of vanes 12a-12f to a different vane position that is bounded by and includes the open and closed positions 18, 20. In this manner, it should be evident that a variable number of commanded positions, each having a distinct vane angle, are achievable depending on the amount of steps between the open and closed positions 18, 20. Furthermore, the use of a stepper motor provides a simplistic means of positioning vanes 12a-12f of vane assembly 12 without the need for position sensors commonly associated with direct current (DC) motor alternatives.

In the illustrated embodiment of FIGS. 3-5, motor 26 is in electrical communication with a vehicle powertrain control module 30, hereafter referred to as "PCM," that determines the vane position. As is known in the art, the PCM 22 determines the vane position based on a variety of inputs that may include vehicle speed, engine coolant temperature, and/or ambient air temperature. Once the vane position is determined, the PCM 22 prompts the motor 26 to position vanes 12a-12f of vane assembly 12 in the selected vane position chosen from the open position 18, closed position 20, and intermediate commanded positions.

The motor 26 may be powered using conventional power supply systems onboard the vehicle and is operably coupled to a controller 32 that controls the amount of power applied to the motor 26. The controller 32 may be external to the motor 26 or may be incorporated into the design of the motor 18, thus enabling the motor to behave as a "smart motor" that is capable of internally regulating power consumption. In any event, by enabling variable power to be applied to the motor 26, a further increase in fuel efficiency may be achieved and is described below in greater detail.

When the vane assembly 12 assumes a selected vane position on a moving vehicle, air pressure may be exerted thereupon and typically increases with increasing vehicle speed. At lower speeds, air pressure is unlikely to generate enough rotational force against the vane assembly 12 to cause unwanted angular displacement of vanes 12a-12f. At higher speeds however, air pressure may exert sufficient rotational force against the vane assembly 12 to force vanes 12a-12f into an undesired vane position, which may also force the motor 26 (i.e. stepper motor) out of position as well. As a result, the vehicle's ability to draw air into the engine compartment 14 for cooling purposes may become impaired.

According to the open position 18 of vane assembly 12 shown in FIG. 3, it can be seen that vanes 12a-12f each provide a relatively small surface area against which air pressure is exerted upon due to vanes 12a-12f having a substantially horizontal configuration. As a result, the orientation of vanes 12a-12f offers little resistance to airflow and air easily passes over and under vanes 12a-12f while flowing into the engine compartment 14. Therefore, with respect to the open position 18 shown in FIG. 3, the effects of air pressure against the vane assembly 12 at higher speeds are unlikely to produce the rotational force necessary to cause unwanted angular displacement of vanes 12a-12f.

Although the closed position 20 shown in FIG. 4 provides a much larger surface area due to vanes 12a-12f having a substantially vertical configuration, it is well known in the art for the housing 16 to include a structure (not shown) that abuts against one or more vanes 12a-12f in the closed position 20 to physically oppose angular displacement of vanes 12a-12f in the direction motivated by air pressure at higher vehicle speeds. Therefore, air pressure is not a concern when vanes 12a-12f are in the closed position 20.

In the commanded position, such as commanded positions 22a and 22b shown in FIG. 5, the vanes 12a-12f are typically suspended in the respective vane position and are therefore susceptible to being angularly displaced in instances where the vehicle is travelling at higher speeds. Furthermore, air pressure impacts each commanded position differently depending on the commanded position's respective vane angle. For example, commanded position 22b will likely experience greater air pressure compared to commanded position 22a when moving at the same speed due to it having a greater surface area for resisting air flow. Therefore, air pressure generates greater rotational force against the vane assembly 12 in commanded position 22b than in commanded position 22a.

In light of the above, the controller 32 is configured to adjust the amount of power applied to the motor 26 for maintaining the vane assembly 12 in any given commanded position such that the rotational force applied against the vane assembly 12 as a result of air pressure is unable to cause angular displacement of vanes 12a-12f of vane assembly 12. As previously described, with respect to the open and closed positions 18, 20 shown in the illustrated embodiments of FIG. 3 and FIG. 4, air pressure is unlikely to generate sufficient rotational force to cause angular displacement of vanes 12a-12f of vane assembly 12. As such, power does not need to be applied to the motor 26 for maintaining vanes 12a-12f in those positions. However, those having ordinary skill in the art will recognize that vane assemblies may be constructed in a variety of ways resulting in other embodiments in which power needs to be applied to a motor in order to maintain an open and/or closed position. For those instances, the following method may be similarly used with very little modification.

Once vanes 12a-12f have been angularly displaced to a commanded position (i.e. commanded positions 22a and 22b), the controller 32 is supplied with a vane position signal and a vehicle speed signal from the PCM 22, wherein the vane position signal includes information related to the current vane position of the vane assembly 12 and the vehicle speed signal includes information related to the current speed of the travelling vehicle. Based on these signals, the controller 32 continuously applies a predetermined amount of power to the motor 26 to maintain the vanes 12a-12f in the selected commanded position at the current vehicle speed such that the rotational force generated from air pressure against the vane assembly 12 is unable to cause angular displacement of vanes 12a-12f.

If the speed of the vehicle changes, the controller 32 receives a new vehicle speed signal from the PCM 22 and adjusts the amount of power being applied to the motor 26 according to the new vehicle speed information and previously obtained vane position information by either increasing or decreasing the amount of hold current being continuously applied to the motor 26 with increasing or decreasing vehicle speed, respectively. For example, if the vane assembly 12 is being maintained in commanded position 22a and the vehicle accelerates, the controller 32 would increase the amount of hold current being continuously applied to the motor 26, thereby increasing its holding power, in order to counteract the increase in rotational force generated by air pressure against the vane assembly 12 due to the vehicle's acceleration and resulting increase in speed. As a result, the increase in rotational force is unable to cause unwanted angular displacement of vanes 12a-12f.

If the vane assembly 12 is moved into a different commanded position, the controller 32 receives a new vane position signal from the PCM 22 and adjusts the amount of power being applied to the motor 26 according to the new vane position information and previously obtained vehicle speed information by either increasing or decreasing the amount of hold current being continuously applied to the motor 26 in response to the change in vane angle of vanes 12a-12f. For example, if the vane assembly 12 is moved from commanded position 22a to commanded position 22b, the change in vane angle results in an increase in rotational force generated by air pressure against the vane assembly 12. In response, the controller 32 would increase the hold current being continuously applied to the motor 26 to increase its holding power in order to prevent unwanted angular displacement of vanes 12a-12f.

In this manner, the motor 26 consumes power as necessary to maintain the vane assembly 12 in the desired commanded position. At greater speeds and/or vane angles associated with increased air pressure, the motor 26 has the necessary holding power to overcome the rotational force exerted against the vane assembly 12 as a result of air pressure, while at decreased speeds and vane angles associated with decreased air pressure, the motor 26 is afforded a lessened work load, which may increase vehicle fuel efficiency and the life span of the motor 26. Depending on the desired complexity of the active grilled shutter system 10, the adjustments in power may be immediately responsive to changes in vehicle speed and/or vane angle, as previously described, or may be responsive only to changes in either speed or vane angle. For example, in one simplified system, a controller may be configured to apply the same amount of hold current to a motor regardless of the vane position and make subsequent adjustments based on vehicle speed alone.

While different types of vane assemblies and motor ensembles will likely require different amounts of hold current for making power adjustments, the amount of hold current necessary for maintaining a particular vane assembly in any given vane position can easily be determined by observing the effects of air pressure against the particular vane assembly at various vehicle speeds. Such observations may be performed by driving a vehicle equipped with the particular vane assembly or through simulation means known to those having ordinary skill in the art. In addition, the effects of wind and/or other driving conditions may also be factored into the final hold current determinations.

Accordingly an active grille shutter system has been advantageously provided herein. The active grille shutter system consumes power as needed in response to changes in vehicle conditions in order to maintain at least one vane in a commanded position, thereby providing added vehicle fuel economy.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An active grille shutter system comprising:
a number of vanes angularly displaceable between an open position, a closed position, a first commanded position between the open position and the closed position, and a second commanded position between the first commanded position and the closed position;
a motor having a variable hold current applied thereto for maintaining the vanes in the first commanded position and the second commanded position; and
a controller configured to adjust the amount of hold current being applied to the motor, wherein when the vanes are in one of the first commanded position and the second commanded position, the controller increases the amount of hold current being applied to the motor with increasing vehicle speed and decreases the amount of hold current being applied to the motor with decreasing vehicle speed and when the vanes are in the first commanded position at a given vehicle speed a first amount of hold current is applied to the motor to maintain the vanes in the first commanded position and when the vanes are in the second commanded position at the given vehicle speed a second amount of hold current is applied to the motor to maintain the vanes in the second commanded position, wherein the second amount of hold current is greater than the first amount of hold current.

2. The active grille shutter system of claim 1, wherein the first commanded position comprises a plurality of selected vane positions and the vanes are positioned at a different vane angle in each of the selected vane positions.

3. The active grille shutter system of claim 1, wherein air pressure exerts increasing rotational force on the vanes at increasing vehicle speeds, wherein the amount of rotational force exerted against the vanes at higher vehicle speeds differs depending on a vane angle of the vanes.

4. The active grille shutter system of claim 3, wherein the amount of hold current being applied to the motor is such that the rotational force being exerted against the vanes is unable to cause angular displacement of the vanes.

5. The active grille shutter system of claim 1, wherein the controller receives a signal comprising vehicle speed information and the signal is supplied to the controller via a vehicle powertrain control module (PCM).

6. An active grille shutter system comprising:
a number of vanes movable between an open position, a closed position, a first commanded position between the open position and the closed position, and a second commanded position between the first commanded position and the closed position;
an actuator configured to maintain the vanes in the first commanded position and the second commanded position; and
a controller configured to adjust an amount of power applied to the actuator based on the position of the vanes and a vehicle speed, wherein when the vanes are in one of the first commanded position and the second commanded position, the controller increases the amount of power applied to the actuator with increasing vehicle speed and decreases the amount of power applied to the actuator with decreasing vehicle speed and when the vanes are in the first commanded position at a given vehicle speed a first amount of power is applied to the actuator to maintain the vanes in the first commanded position and when the vanes are in the second commanded position at the given vehicle speed a second amount of power is applied to the actuator to maintain the vanes in the second commanded position, wherein the second amount of power is greater than the first amount of power.

7. The active grille shutter system of claim 6, wherein the vanes are angularly displaceable between the open position, the closed position, the first commanded position and the second commanded position.

8. The active grille shutter system of claim 6, wherein the vanes are disposed at a first angular position in the open position, a second angular position in the closed position, a third angular position in the first commanded position, and a fourth angular position in the second commanded position.

9. The active grille shutter system of claim 8, wherein air pressure exerts increasing rotational force on the vanes at increasing vehicle speeds, wherein the amount of rotational force exerted against the vanes at higher vehicle speeds differs depending on the angular position of the vanes.

10. The active grille shutter system of claim 9, wherein the amount of power being applied to the actuator is such that the rotational force being exerted against the vanes is unable to cause angular displacement of the vanes.

11. The active grille shutter system of claim 6, wherein the actuator is an electric motor.

12. The active grille shutter system of claim 11, wherein the controller makes power adjustments by changing the amount of hold current being applied to the actuator.

13. The active grille shutter system of claim 12, wherein the controller receives a signal containing vehicle speed information from a vehicle powertrain control module (PCM).

14. The active grille shutter system of claim 12, wherein the controller increases the amount of hold current being applied to the motor with increasing vehicle speed and decreases the amount of hold current being applied to the motor with decreasing vehicle speed.

\* \* \* \* \*